US012326236B2

(12) United States Patent
Slowik et al.

(10) Patent No.: US 12,326,236 B2
(45) **Date of Patent: *Jun. 10, 2025**

(54) SYSTEMS AND METHODS FOR ADAPTIVE ENERGY STORAGE IN AN ILLUMINATION SYSTEM

(71) Applicant: ZEBRA TECHNOLOGIES CORPORATION, Lincolnshire, IL (US)

(72) Inventors: Joseph S Slowik, Nesconset, NY (US); Christopher P. Klicpera, Westbury, NY (US)

(73) Assignee: Zebra Technologies Corporation, Lincolnshire, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/595,310

(22) Filed: Mar. 4, 2024

(65) Prior Publication Data

US 2024/0210002 A1 Jun. 27, 2024

Related U.S. Application Data

(63) Continuation of application No. 17/734,931, filed on May 2, 2022, now Pat. No. 11,920,760, which is a continuation of application No. 17/171,673, filed on Feb. 9, 2021, now Pat. No. 11,320,103, which is a continuation of application No. 16/803,662, filed on Feb. 27, 2020, now Pat. No. 10,948,144.

(51) Int. Cl.
*H05B 45/30* (2020.01)
*F21S 9/02* (2006.01)
*H05B 45/37* (2020.01)
*F21Y 115/10* (2016.01)

(52) U.S. Cl.
CPC ................ *F21S 9/02* (2013.01); *H05B 45/30* (2020.01); *F21Y 2115/10* (2016.08)

(58) Field of Classification Search
CPC ........ H05B 45/14; H05B 45/18; H05B 45/20; H05B 45/28; H05B 45/30; H05B 45/37; H05B 45/3725; H05B 47/14; H02M 3/1582; F21S 9/02
See application file for complete search history.

(56) References Cited

U.S. PATENT DOCUMENTS

| | | | | |
|---|---|---|---|---|
| 8,299,715 | B2 * | 10/2012 | Philippbar | H05B 45/3725 315/307 |
| 10,225,903 | B1 * | 3/2019 | Fernandez | H05B 45/56 |
| 10,278,270 | B2 * | 4/2019 | Cho | H05B 47/16 |

(Continued)

*Primary Examiner* — Thai Pham

(57) ABSTRACT

Systems and methods for adaptive energy storage in an illumination system are disclosed herein. An example method includes (1) obtaining, by one or more processors, data stored at a memory of a illumination unit; (2) obtaining, by one or more processors, a temperature value from a temperature sensor; (3) analyzing, by one or more processors, the obtained data and the temperature value to determine a capacitor voltage to operate LEDs in accordance with an illumination cycle; and (4) control, by one or more processors, a voltage controller to convert an input voltage to the voltage controller to the determined capacitor voltage, wherein the voltage controller is configured to apply the determined capacitor voltage to a capacitor.

18 Claims, 6 Drawing Sheets

(56) References Cited

U.S. PATENT DOCUMENTS

| | | | | |
|---|---|---|---|---|
| 2011/0085576 | A1* | 4/2011 | Crawford | H05B 45/38 372/38.07 |
| 2013/0119923 | A1* | 5/2013 | Wright | H02J 7/345 320/166 |

* cited by examiner

SYSTEMS AND METHODS FOR ADAPTIVE ENERGY STORAGE IN AN ILLUMINATION SYSTEM

CROSS-REFERENCE TO RELATED APPLICATIONS

This application is a continuation of U.S. patent application Ser. No. 17/734,931, filed on May 2, 2022, which is a continuation of U.S. patent application Ser. No. 17/171,673, filed on Feb. 9, 2021, which is a continuation of U.S. patent application Ser. No. 16/803,662, filed on Feb. 27, 2020, all of which are incorporated herein by reference in their entirety.

BACKGROUND

Many illumination systems rely upon capacitors to store energy for powering the illumination elements, such as light emitting diodes (LEDs). However, capacitors have a limited operational life. Operational characteristics of the illumination system impact the length of the capacitor life. Accordingly, there is a need to improve the operational life of illumination system capacitors by using systems and methods for adaptive energy storage.

In another aspect, traditional illumination power systems are configured to provide a fixed illumination voltage. To this end, in order to ensure that the illumination system will operate in most scenarios, traditional illumination power systems are configured to provide sufficient voltage for a worst case scenario. Thus, if the illumination system requires less power, the excess voltage is dissipated as heat. Thus, there is also a need to reduce power that is dissipated as heat in illumination systems by implementing systems and methods for an adaptive power dower drive.

SUMMARY

In an embodiment, the present invention is an energy storage system for an illumination system of an imaging unit. The energy storage system includes (i) an illumination port adapted to receive an illumination unit that includes one or more light emitting diodes (LEDs) and a memory storing data indicative of the LEDs; (ii) a capacitor configured to store energy for powering the illumination unit; (iii) an LED driver configured to draw power from the capacitor and supply power to the illumination port; (iv) a temperature sensor configured to sense a temperature of the capacitor; and (v) a voltage controller. The voltage controller includes (a) a power input port operatively connected to a power supply; (b) an input port configured to receive a control signal for setting an output voltage; and (c) a voltage output port operatively connected to the capacitor. The voltage controller is configured to convert a voltage sensed at the power input port to an output voltage supplied to the voltage output port. The energy storage system also includes at least one processor operatively connected to the temperature sensor, the illumination unit, and the voltage controller. The at least one processor is configured to (1) obtain the data stored at the memory of the illumination unit; (2) obtain a temperature value from the temperature sensor; (3) analyze the obtained data and the temperature value to determine a minimum capacitor voltage to operate the LEDs in accordance with an illumination cycle; and (4) send a control signal to the input port of the voltage controller to set the output voltage of the voltage controller to the determined minimum capacitor voltage.

In another embodiment, the present invention is a method for adaptive energy storage at an illumination system of an imaging unit. The illumination system includes (i) an illumination port adapted to receive an illumination unit that includes one or more light emitting diodes (LEDs) and a memory storing data indicative of the LEDs; (ii) a capacitor configured to store energy for powering the illumination unit; (iii) an LED driver configured to draw power from the capacitor and supply power to the illumination port; (iv) a temperature sensor configured to sense a temperature of the capacitor; and (v) a voltage controller. The method includes (1) obtaining, by one or more processors, the data stored at the memory of the illumination unit; (2) obtaining, by one or more processors, a temperature value from the temperature sensor; (3) analyzing, by one or more processors, the obtained data and the temperature value to determine a minimum capacitor voltage to operate the LEDs in accordance with an illumination cycle; and (4) control, by one or more processors, the voltage controller to convert an input voltage to the voltage controller to the determined minimum capacitor voltage, wherein the voltage controller is configured to apply the determined minimum capacitor voltage to the capacitor.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
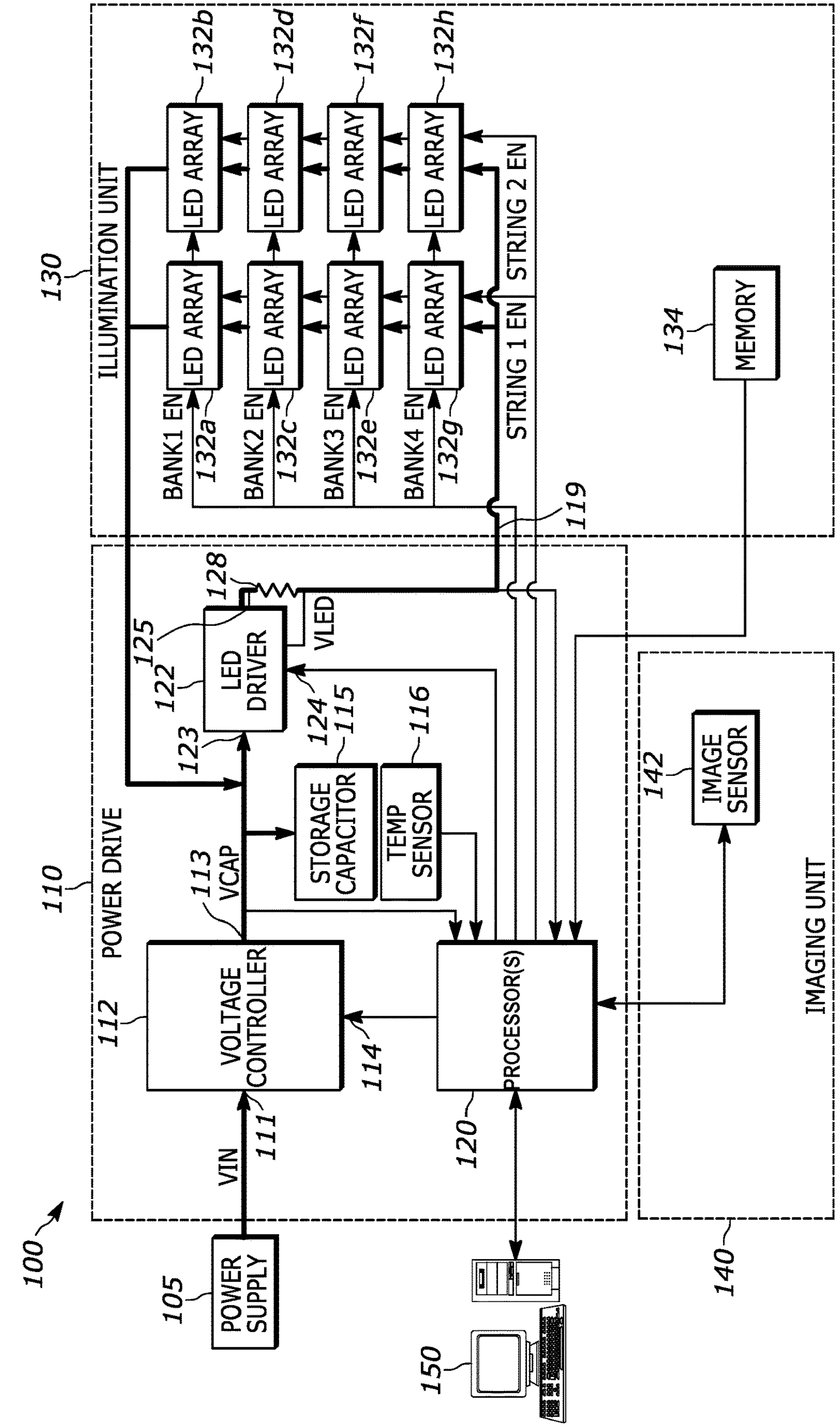
FIG. 1 illustrates an example illumination system that implements the adaptive energy storage techniques disclosed herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Capacitors have a limited operational life based on the operating environment in which the capacitor is implemented. To this end, both operating temperature and capacitor voltage impact the capacitor life. That is, the hotter the temperature and the higher the capacitor voltage, the shorter the capacitor life. In a first set of techniques described herein, capacitor voltage is adaptively controlled to minimize the voltage at which the capacitor is charged. In a second set of techniques described herein, capacitor temperature is lowered by reducing the amount of power dissipated as heat. By implementing one or both of the disclosed techniques, the capacitor life is extended thereby increasing the operational lifetime of the illumination system.

FIG. 1 illustrates an example illumination system 100 that implements the adaptive energy storage techniques disclosed herein. In FIG. 1, the current supply path for the illumination unit is depicted in thicker lines, whereas the control connections are depicted in thinner lines. The illumination system 100 may be implemented in an industrial environment. For example, the illumination system 100 may be implemented in an assembly line to detect barcodes placed on parts and/or to detect defects on parts. As illustrated, there are three main components of the illumination system 100: an imaging unit 140 configured to capture image data; an illumination unit 130 for providing illumination light to facilitate the capture of image data; and a power driver 110 configured to provide power to the illumination unit 130.

Starting with the imaging unit 140, the imaging unit 140 may include a camera or a wide angle camera and include any known imaging components for capturing image data. For example, the imaging unit 140 may include an array of image sensors 142 configured to detect reflections of light that pass through a lens system. In some embodiments, the imaging unit 140 includes one or more filters configured to filter the reflected light before and/or after it is sensed by the image sensors 142.

Turning to the illumination unit 130, the illumination unit 130 includes one or more LEDs 132 and a memory 134. In the illustrated embodiment, the illumination unit 130 includes four banks of LEDs 132 separated into two groupings 132*a-h* each. Each of the banks may include a switch associated therewith to controllably prevent current from flowing to the respective LEDs 132 within the bank. For example, a switch associated with bank 1 may block current from flowing into LEDs groupings 132*a* and 132*b*. Similarly, each of the groupings of LEDs may be associated with a switch to controllably cause the current flowing into the LED bank to bypass the LED grouping 132*a-h*. It should be appreciated that the switches need not be physical switches, such as relays, but may instead be electrical switches implemented via a transistor.

The memory of the illumination unit 130 may be configured to store various information about the LEDs 132. For example, the memory 134 may store a category voltage for the LEDs 132, a category current for the LEDs 132, a category temperature for the LEDs 132, a number of LEDs 132, an LED color for the LEDs 132, an LED binning for the LEDs 132, an LED grouping arrangement (e.g., a logical positioning of the LEDs 132 in terms of bank and group numbering), a physical arrangement (e.g., a physical location of the LEDs 132 on the illumination unit 130), a model number for the illumination unit 130, and/or other information about the illumination unit 130 and/or the LEDs 132.

In the illustrated example, the illumination unit 130 is connected to the power drive 110 via an illumination port 119. While FIG. 1 depicts the current supply to the LEDs 132 and the logical connection to the memory 134 occurring at different points, in some embodiments, both connections may be included in a single connector (e.g., a parallel port connector). It should be appreciated that in some embodiments, the banks that form the illumination unit 130 may be separate illumination boards. In some implementations of this embodiment, the illumination port 119 may be configured to receive a connector associated with each illumination board. In other implementations, each illumination board includes two connectors for stacking and/or daisy chaining the illumination boards onto one another. In these implementations, the illumination port 119 may be configured to receive the connector from the closest illumination board, which in turn, receives the connector from the next closest illumination board, and so on.

Turning to the power driver 110, the power drive 110 includes a processor 120 configured to adaptively control operation of the illumination system 100. The processor 120 may be a microprocessor and/or other types of logic circuits. For example, the processor 120 may be a field programmable gate array (FPGA) or an application specific integrated circuits (ASIC). Accordingly, the processor 120 may be capable of executing instructions to, for example, implement operations of the example methods described herein, as may be represented by the flowcharts of the drawings that accompany this description. The machine-readable instructions may be stored in the memory (e.g., volatile memory, non-volatile memory) of the processor 120 and corresponding to, for example, the operations represented by the flowcharts of this disclosure and/or operation of the illumination unit 130 and/or the imaging unit 140.

For example, the processor 120 may be configured to control operation of the switches of the illumination unit 130. To this end, control for the LED bank switches and control of the LED grouping switches may be multiplexed onto respective control lines connected to general purpose input/output (GPIO) ports of the processor 120. Accordingly, the processor 120 is able to set the control state for the switches of the illumination unit 130 by transmit control instructions via the respective GPIO port.

The example power drive 110 also includes a voltage controller 112 configured to boost an input voltage at a power input port 111 to a programmable output voltage supplied to a voltage output port 113. In some embodiments, the voltage controller 112 is a DC-DC buck/boost voltage converter. Accordingly, the voltage controller 112 includes one or more input ports 114 via which the processor 120 controls operation of the voltage controller 112. For example, one of the input ports 114 may be an output voltage control via which the processor 120 sets the output voltage supplied to the voltage output port 113. As will be described below, the processor 120 may determine a minimum capacitor voltage needed to recharge a storage capacitor 115 to a charge level that meets a power requirement for operation of the LEDs 132 of the illumination unit 130 during an illumination cycle. Accordingly, the processor 120 may be configured to set the output voltage to this determined minimum capacitor voltage level.

As another example, one of the input ports 114 may correspond to a current-limiter port via which the processor 120 sets a maximum current flowing into the voltage controller 112. To this end, a power supply 105 connected to the power input port 111 may be associated with a maximum current rating. For example, if the power supply 105 is a universal serial bus (USB) power supply, the maximum current may be 500 mA, 900 mA, 1.5 A, or 3 A depending on the USB version implemented.

The storage capacitor 115 is configured to store charge for powering illumination cycles and/or pulses thereof executed by the illumination unit 130. While FIG. 1 depicts the storage capacitor 115 as a single capacitor, the storage capacitor 115 may be a bank of capacitors connected in series and/or parallel with one another. The example illumination unit 130 is configured to draw power from the capacitor 115 (via an LED driver 122). The example storage capacitor 115 is connected to the output port 113 of the voltage controller 112 such that the boosted voltage drawn from the power supply 105 is used to recharge the storage capacitor 115. To this end, the minimum capacitor voltage determined by processor 120 may correspond to the minimum voltage level to recharge the storage capacitor 115 to a voltage level sufficient to power a subsequent illumination cycle and/or pulse thereof. Accordingly, the storage capacitor 115 is subjected to the minimum voltage required for operation of the illumination unit 130, thereby extending the life of the storage capacitor 115.

The example LED driver 122 is configured to draw power from the storage capacitor 115 connected at a voltage input port 123 and boost the capacitor voltage to a voltage level that supplies a current set point value at a current output port 125. To this end, the LED driver 122 may include an input port 124 via which the processor 120 sets the current set point value of the LED driver 122. As illustrated, the current output port 125 is connected to the illumination port 119 to provide power to the illumination unit 130.

In the illustrated example, to detect the output current at the current output port 125, the LED driver 122 may be connected to a sense resistor 128 having a known resistance. To this end, the LED driver 122 may include ports operatively connected on either side of the sense resistor 128. Thus, the LED driver 122 is able to determine a voltage drop across the sense resistor 128 for comparison to the known resistance of the sense resistor 128 to determine the output current. The LED driver 122 may then ramp up the voltage supplied to the current output port 125 until the output current reaches the current set point programmed by the processor 120.

It should be appreciated that during operation, the voltage drop of the LEDs 132 changes due to different illumination needs. Thus, the voltage boost requirement for proper operation of the LEDs changes as well. Because traditional power drives for illumination assemblies supply a fixed voltage, traditional power drives always provides a worse case voltage level causing heat dissipation when less voltage is needed. Instead, the adaptive power drive techniques described herein control the power supplied to the LEDs 132 based on a current requirement. Thus, the LED driver 122 adaptively adjusts the voltage supplied to the LEDs (via the illumination port 119) based on actual operation of the LEDs. Accordingly, there is less excess power that dissipates as heat.

The processor 120 is also connected to a temperature sensor 116 configured to sense a temperature of the storage capacitor 115. Based on the sensed temperature, the processor 120 may adjust the determined minimum capacitor voltage. To this end, if the capacitor temperature increases, the processor 120 may decrease the minimum capacitor voltage to offset the change in capacitor life. In some scenarios, the decreased minimum capacitor voltage may be insufficient to recharge the storage capacitor 115 for a subsequent illumination cycle and/or pulse. Accordingly, the processor 120 may adjust operation of the illumination unit 130 and/or the imaging unit 140 to provide additional time for the storage capacitor 115 to recharge. For example, the processor 120 may control the illumination unit 130 and/or the imaging unit 140 to operate a slower frame rate, operate at a lower current and/or operate with a short pulse duration. Similarly, the processor 120 may adjust the illumination cycle and/or pulse to bypass additional LEDs 132 of the illumination unit 130. As a result of these adjustments, the illumination cycle and/or pulse requires less voltage, thereby enabling the voltage controller 112 to sufficiently recharge the storage capacitor 115 at the lower minimum capacitor voltage.

The processor 120 may also include an input/output (I/O) port for exchanging data with operator device 150. To this end, the operator device 150 may control operation of the industrial environment that includes the illumination system 100. For example, the operator device 150 may be a workstation computer, a laptop, a mobile phone, or any other computing device permitted to control operation of the industrial environment and/or the illumination system 100. Accordingly, the operator device 150 may include an illumination design application that enables the operator to design illumination cycles that are executed by the illumination system 100. For example, if the illumination system 100 is a part of a production line for an object, the illumination cycle may configure the illumination unit 130 to provide different lighting conditions to detect different features of the object passing in front of the imaging unit 140. The operator device 150 may convert the illumination design into a set of illumination control instructions that are downloaded into the processor 120 via the I/O port. Accordingly, the processor 120 may configure the illumination unit 130 (and/or the various switches thereof) in accordance with the illumination control instructions.

Additionally, the processor 120 may send data to the operator device 150 via the I/O port. For example, the memory 134 of the illumination unit 130 may include information about the physical and/or logical location of the LEDs 132. Accordingly, the illumination design application may present an interface the depicts the layout of the LEDs 132 for improved design control and/or simulation. As another example, the memory 134 may include a model number for the illumination unit 130. Accordingly, the illumination design application may query an illumination unit database (not depicted) to determine the location of the LED. As another example, the processor 120 may obtain a maximum current rating for the LEDs 132 from the memory 134 to provide to the operator device 150. Accordingly, the illumination design application may be configured to simulate the control instructions before downloading them to the processor 120 to ensure compliance with the maximum current ratings.

Figure 2A:
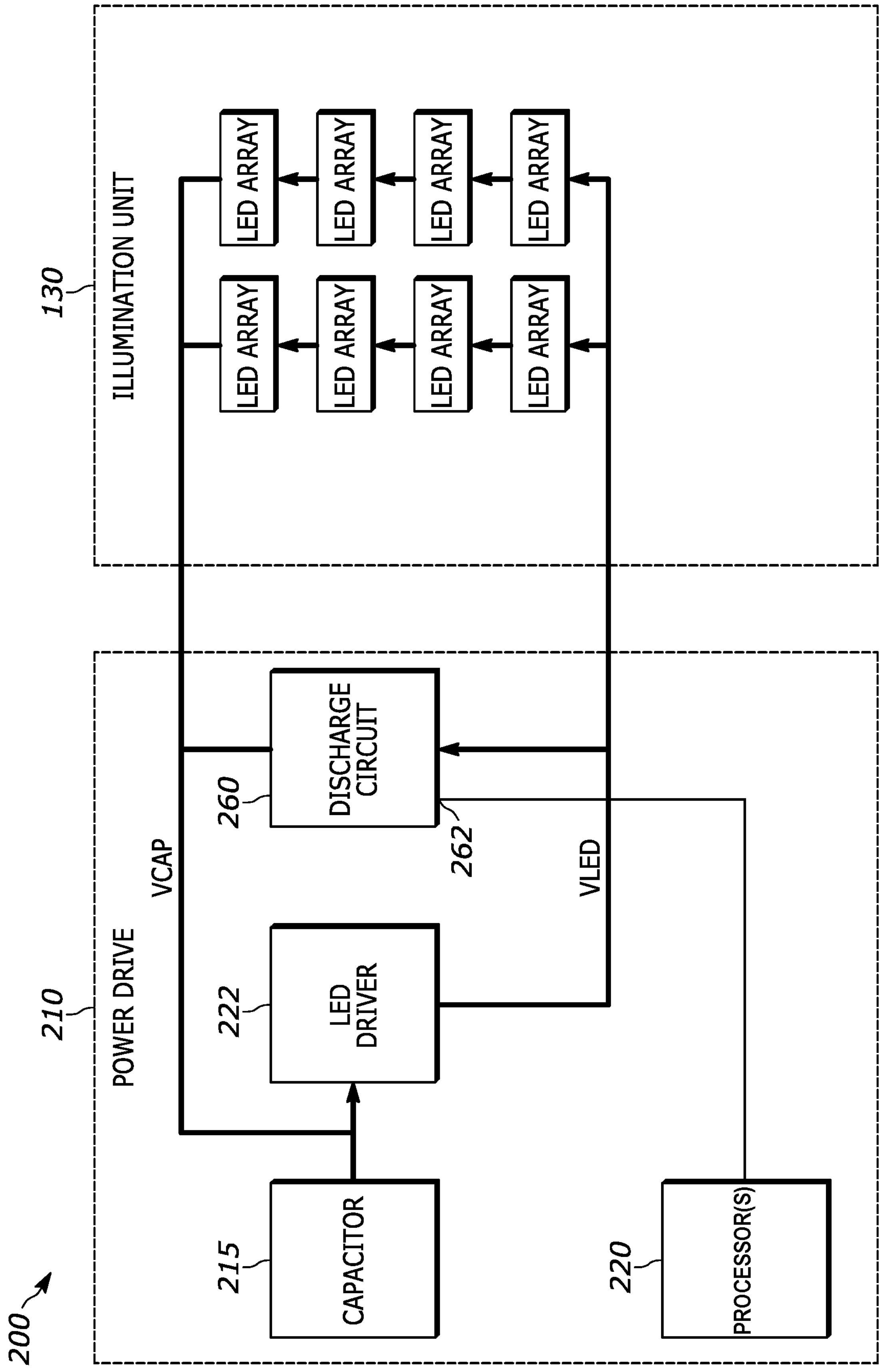
FIG. 2A illustrates an example illumination system that includes an active discharge circuit.
Figure 2B:
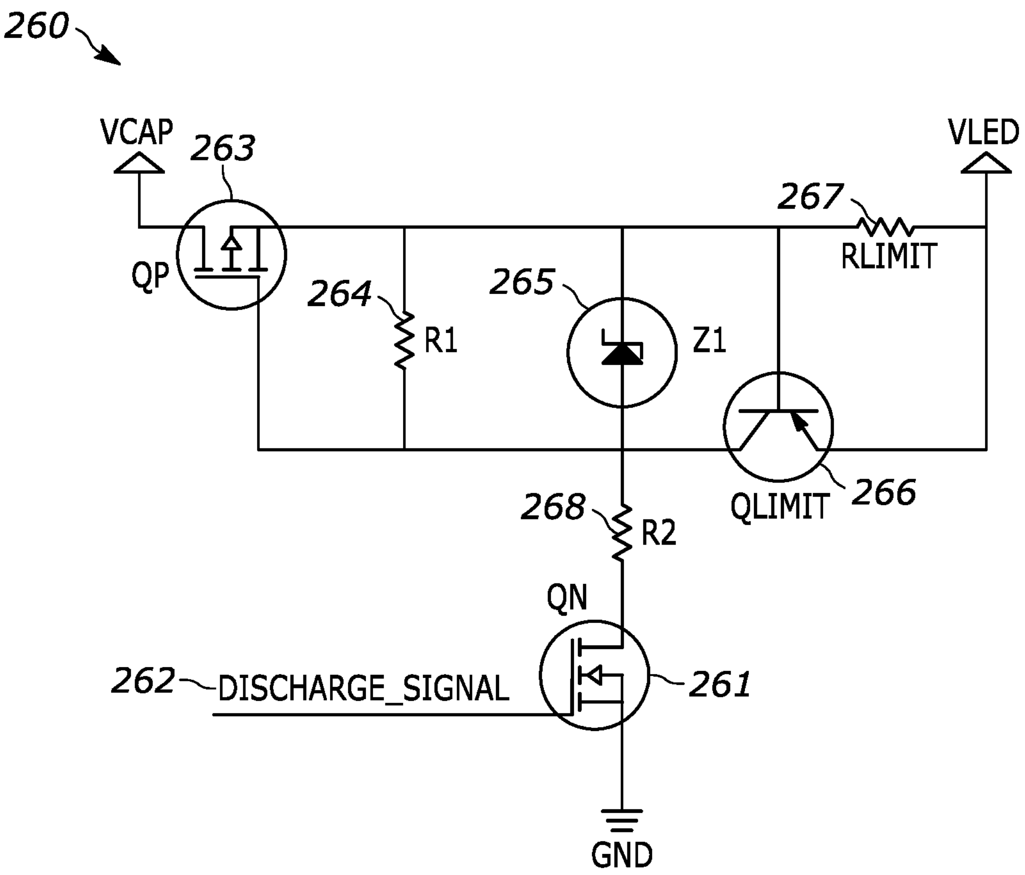
FIG. 2B illustrates an example active discharge circuit.

Turning now to FIGS. 2A-2B, illustrated is an example illumination system 200 that is a modification of the illumination system 100. In particular, the example illumination system 200 includes a power drive 210 that includes an active discharge circuit 260. The power drive 210 also includes a capacitor 215, a LED driver 222 a processor 220, which may be the storage capacitor 115, the LED driver 122, and the processor 120 of FIG. 1, respectively.

The active discharge circuit 260 may be configured to discharge the LED voltage (VLED) to the capacitor voltage (VCAP) to ensure safe operation of the illumination unit 130. To this end, the processor 220 may be configured to control the illumination unit 130 to perform consecutive illumination pulses with different configurations of the LEDs 132. Accordingly, if the voltage required to drive the LEDs 132 decreases between consecutive illumination pulses, the initial, higher illumination voltage may not be sufficiently discharged below the voltage level need for the next, lower illumination pulse. For example, the next, lower illumination pulse may enable fewer LEDs 132 and/or operate the LEDs at a color that requires less power (e.g., red vs. white illumination). This excess voltage may damage the LEDs 132 when executing the lower illumination pulse. By actively discharging this excess voltage, the active discharge circuit 262 ensures safe operation of the illumination unit 130.

As illustrated, the active discharge circuit 260 includes an input port 262 that enables the processor 220 to activate the active discharge circuit 260. For example, by sending a control signal to the input port 262, the processor 220 closes a switch (not depicted) to cause current supplied by the LED driver 222 to flow into the active discharge circuit 260 instead of the illumination unit 130 (via an illumination port, such as the illumination port 119 of FIG. 1) while the capacitor 215 is recharging. Thus, the processor 220 may be configured to analyze illumination control instructions stored thereat to detect when voltage required for consecutive illumination pulses decreases and accordingly control the discharge circuit 260 via the input port 262.

FIG. 2B illustrates an example active discharge circuit 260 that may be implemented in the power drive 210 of FIG. 2A. When the processor 260 sends a high voltage signal to the input port 262, a nFET transistor 261 (QN) is activated and connects the discharge current to ground. Accordingly, resistors 264 (R1) and 268 (R2) act as a voltage divider where the base voltage of a bi-polar junction transistor (BJT) 266 ("Qlimit") is greater than the collector voltage of the BJT 266. As a result, a pFET transistor 263 (QP) is activated and current is conducted through a resistor 267 ("Rlimit"), thereby causing a voltage drop from the VLED voltage level at the base of the BJT 266. When this voltage drop reaches the emitter-base threshold of the BJT 266, the BJT 266 becomes active, increasing the gate voltage for the pFET 263, thereby causing the pFET 263 to operate in the ohmic region. When the pFET 263 operates in the ohmic region, the active discharge circuit 260 operates at a constant current level based on the relationship between the current limiting resistor 267 and a base-emitter voltage threshold of the BJT 266. The example active discharge circuit 260 also includes a Zener diode 265 (Z1) to limit the gate-source voltage of the PFET transistor 263 to a safe voltage level during the discharge of VLED.

Figure 3:
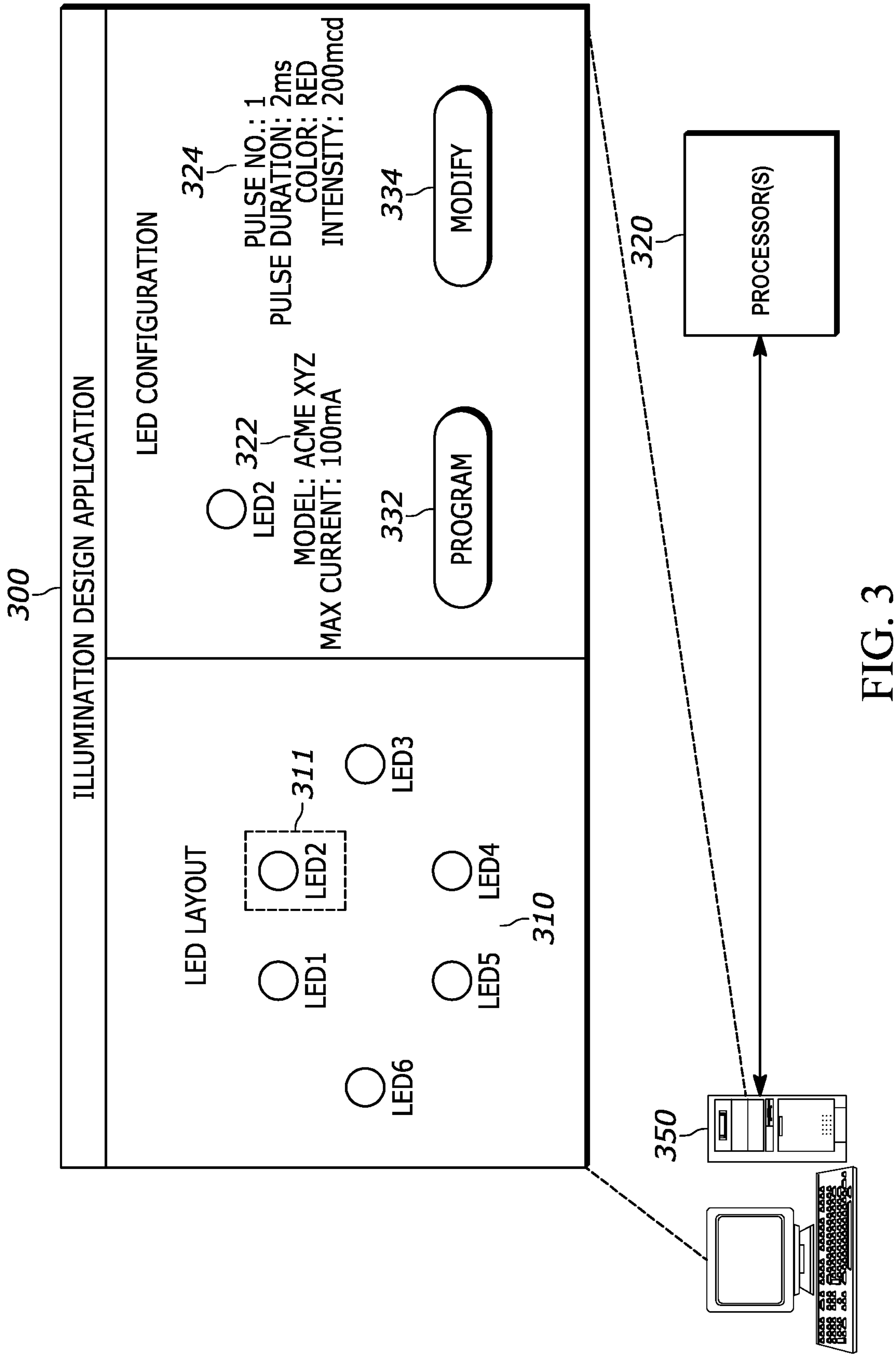
FIG. 3 illustrates an example user interface for an illumination design application.

Turning to FIG. 3, illustrated an example user interface 300 for an illumination design application executing on an operator device 350 (such as the operator device 150 of FIG. 1). The operator device may be connected to an I/O port of a processor 320 (such as the processor 120 of FIG. 1, the processor 220 of FIG. 2A, and/or another similarly configured logic circuit). As described above, the illumination design application may be configured to enable an operator to design a set of illumination control instructions indicative of an illumination cycle performed by an illumination unit (such as the illumination unit 130 of FIGS. 1-2B).

The illumination design application be configured to poll the processor 320 for information to populate the user interface 300. For example, the illumination design application may be configured to obtain an LED layout from the processor 320 to present a visual indication 310 thereof. In some embodiments, the indication of the LED layout 310 may also indicate the position of the LEDs relative to an object of interest. The indication representative of the individual LEDs in the LED layout 310 may be selectable to present corresponding LED configuration panel.

As illustrated, the LED configuration panel may include static information 322 describing the selected LED and programmable information 324. The illumination design application may obtain the displayed information from the processor 320. Accordingly, the operator may modify the programmable information 324 by selecting an interface element 334 and inputting values for the respective programmable fields. It should be appreciated that if the operator modifies the pulse number field, the user interface 310 may obtain new information corresponding to the new pulse. Accordingly, the operator is able to design illumination cycles that include any number of pulses via the user interface 300.

When the operator finishes designing the illumination cycle, the operator may interact with a user element 332 to program the processor 320 with a set of illumination control instructions corresponding to the designed illumination cycle. After receiving the set of control instructions, the processor 320 may control one or more switches of the illumination unit and/or program the LEDs accordingly. In some embodiments, prior to downloading the set of illumination control instructions into the processor 320, the illumination design application performs a simulation of the illumination cycle to determine compliance with operational limits of the LEDs, such as a maximum current. Accordingly, if the simulated illumination cycle does not perform within the operational limits, the illumination design application may present a warning to the operator. The warning may indicate the particular LED that would not comply with the operational limit and provide an indication of how to adjust the illumination cycle accordingly.

Figure 4:
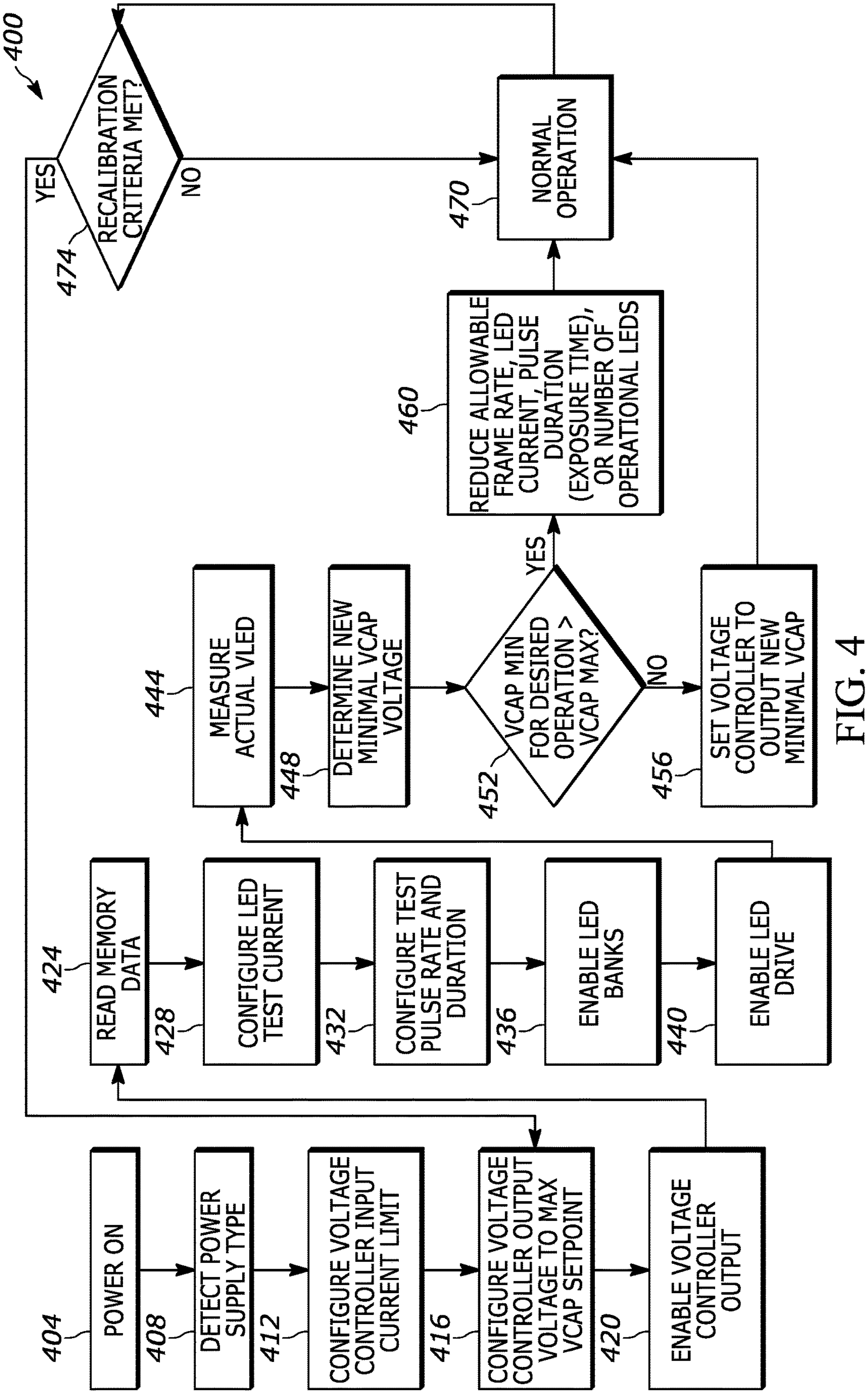
FIGS. 4 and 5 illustrate example flow diagrams that implement the adaptive energy storage techniques described herein.

Turning now to FIG. 4, illustrated is an example flow diagram 400 for implementing the adaptive energy storage techniques described herein. The flow diagram may be performed by a processor of an illumination system (such as the processor 120, 220, or 320 or FIGS. 1, 2A, and 3, respectively, and/or another similarly configured logic circuit).

At block 404, the processor is powered on. More particularly, the processor may be connected to a power supply (such as the power supply 105 of FIG. 1, such as by closing a switch associated with the power supply.

At block 408, the processor detects a power supply type. For example, the processor may determine a DC voltage level supplied by the power supply. As another example, the processor obtains information about the power supply from a memory associated with the power supply. To this end, the memory may include an indication of a maximum current rating for the power supply. In some embodiments, the power supply is a 5V USB power supply.

At block 412, the processor configures a voltage controller (such as the voltage controller 112 of FIG. 1) to enforce the current limit associated with the power supply. More particularly, the processor may send a control signal to the voltage controller via an input port associated with a current limiter. In response, the voltage controller ensures that a current drawn from the power supply does not exceed the current limit.

At block 416, the processor configures the voltage controller to output a maximum capacitor voltage for a storage capacitor (such as the capacitors 120 and 220 of FIGS. 1 and 2A, respectively). The maximum capacitor voltage may be determined based upon the known characteristics for the storage capacitor. For example, the maximum voltage rating for the storage capacitor may be stored in a memory associated with the storage capacitor. It should be appreciated that operating a capacitor at its maximum voltage may significantly shorten the life of the storage capacitor. Accordingly, in some embodiments, the "maximum" capacitor voltage is actually a percentage (e.g., 60%, 70%, 75%) of the true maximum capacitor voltage. As described above, capacitor life is also based on capacitor temperature.

Accordingly, the percentage may vary based upon capacitor temperature. That is, the hotter capacitor temperature, the lower the percentage the "maximum" capacitor voltage is of the true maximum voltage. After determining the "maximum" capacitor voltage, the processor may send a control signal to an input port of the voltage controller to cause the voltage controller to boost the power supply voltage using the signaled "maximum" capacitor voltage level as a setpoint value.

At block 420, the processor enables the voltage controller output. More particularly, the processor sends a control signal to an input port of the voltage controller to cause the voltage controller to begin boosting the input voltage from the power supply to the signaled setpoint voltage (i.e., the determined "maximum" capacitor voltage).

At block 424, the processor obtains data about one or more LEDs (such as the LEDs 132 of FIGS. 1 and 2A) of an illumination unit (such as the illumination unit 130 of FIGS. 1 and 2A) from a memory (such as the memory 134 of FIG. 1) of the illumination unit. To this end, the processor may be programmed with a set of illumination control instructions to perform a designed illumination cycle. Accordingly, the processor may be configured to execute a calibration illumination cycle including one or more calibration pulses to determine an expected voltage requirement to power the LEDs during the illumination cycle. Accordingly, the processor may identify obtain data characteristics for LEDs that are active during the illumination cycle. Based on the obtained data, the processor may determine a current requirement and a pulse duration for the calibration pules.

At block 428, the processor configures an LED driver (such as the LED drivers 122 and 222 of FIGS. 1 and 2A, respectively) to provide the determined current requirement (i.e., the test current). To this end, the processor may send a control signal to an input port of the LED driver that controls the LED driver to use the determined current requirement as a current output setpoint.

At block 432, the processor configures the LED driver to provide a pulse having characteristics based on the obtained data. That is, the processor may configure the LED driver to provide a pulse having a duration of the identified calibration pulse and a pulse rate based on characteristics of the programmed illumination cycle. Accordingly, the processor may configure the pulse duration and rate by signalling the LED driver via one or more input ports.

At block 436, the processor enables the LED banks. More particularly, the processor configures the LEDs in accordance with the illumination cycle. To this end, the processor may output a set of control instructions over one or more GPIO ports to control switches associated with the LED banks and/or grouping of LEDs within the LED banks. For example, the processor may transmit control signals over the GPIO ports that implement multiplexing techniques to signal the control state for the switches of the LED banks and/or LED groupings. Additionally, illumination unit includes color-programmable LEDs, the processor may be configured to set the LED color for the LEDs as well. After setting the switches of the illumination unit and the LED colors, the processor may close a switch to connect the illumination unit to the LED driver.

At block 440, the processor enables the LED driver. More particularly, the processor sends a control signal to the LED driver via an input port to begin supplying the current to the illumination unit in accordance with the illumination cycle. At this point, the illumination unit begins drawing power.

At block 444, the processor determines an actual LED voltage when the illumination unit is operated in accordance with the calibration cycle. Because the LED driver is configured with a current setpoint, during execution of the calibration pulse, the LED driver will adjust the supplied voltage to maintain the current output setpoint. By measuring the maximum voltage supplied to the illumination unit during the calibration cycle, the processor is able to determine actual voltage required to power the LEDs.

At block 448, the processor determines a minimal capacitor voltage required to supply the actual voltage requirement to power the LEDs. More particularly, based on the measured actual voltage requirement and the current setpoint, the processor may determine a power requirement to execute the calibration cycle via the illumination unit. Based on this power requirement, the processor determines a minimum capacitor voltage needed to recharge the storage capacitor between pulses to store enough energy to satisfy the calibration cycle power requirement. This determination may be based on known capacitor characteristics and the pulse rate of the calibration cycle.

At block 452, the processor determines whether the minimal capacitor voltage is greater than the "maximum" capacitor voltage. If the minimal capacitor voltage is less than the "maximum" capacitor voltage, then it is safe to operate the illumination unit in accordance with the illumination cycle. In this scenario, the flow diagram 400 follows the "no" branch to block 456. If the minimal capacitor voltage is greater than the "maximum" capacitor voltage, then the flow diagram 400 follows the "yes" branch to block 460.

At block 456 (following the "no" branch), the processor sets the voltage controller to output the minimal capacitor voltage. More particularly, the processor sends a control signal to the input port of the voltage controller to reduce the output voltage setpoint from the "maximum" capacitor value to the minimal capacitor value.

At block 460 (following the "yes" branch), the processor performs one or more actions to reduce the voltage requirement to perform the illumination cycle. For example, the processor may configure the illumination unit and/or an imaging unit (such as the imaging unit 140 of FIG. 1) to reduce a frame rate to allow more time for the capacitor to recharge. As another example, the processor may reduce LED current and/or the pulse duration such that illumination cycles has a lower power requirement. As yet another example, the processor may change the control state of a switch associated with an LED bank and/or LED grouping to reduce the number of LEDs active during the illumination cycle (e.g., by preventing current to flow into the LED bank or by bypassing a grouping of LEDs).

At block 470, the processor controls the illumination unit in accordance with normal operation. That is, the processor repeatedly executes the programmed illumination cycle.

At block 474, the processor determines whether a recalibration criteria has been satisfied. For example, if the capacitor temperature has increased during operation, the "maximum" capacitor may decrease more than originally determined at block 416. Accordingly, one recalibration criterion may be an increase in temperature beyond a threshold amount. As another example, the recalibration criteria may include an indication of illumination system usage (e.g., an elapsed time or a number of illumination cycles and/or pulses thereof). As yet another example, the recalibration criteria may include a change in pulse characteristics (e.g., pulse duration, pulse current) or a change in illumination unit configuration (e.g., detecting a change in the number of LED banks and/or detecting a change in the number of operable LEDs thereof). If a recalibration criteria is satisfied, the flow diagram 400 follows the "yes" branch to block 416 to execute a new calibration cycle. Otherwise, the flow diagram 400 follows the "no" branch to block 470 to resume normal operation.

Figure 5:
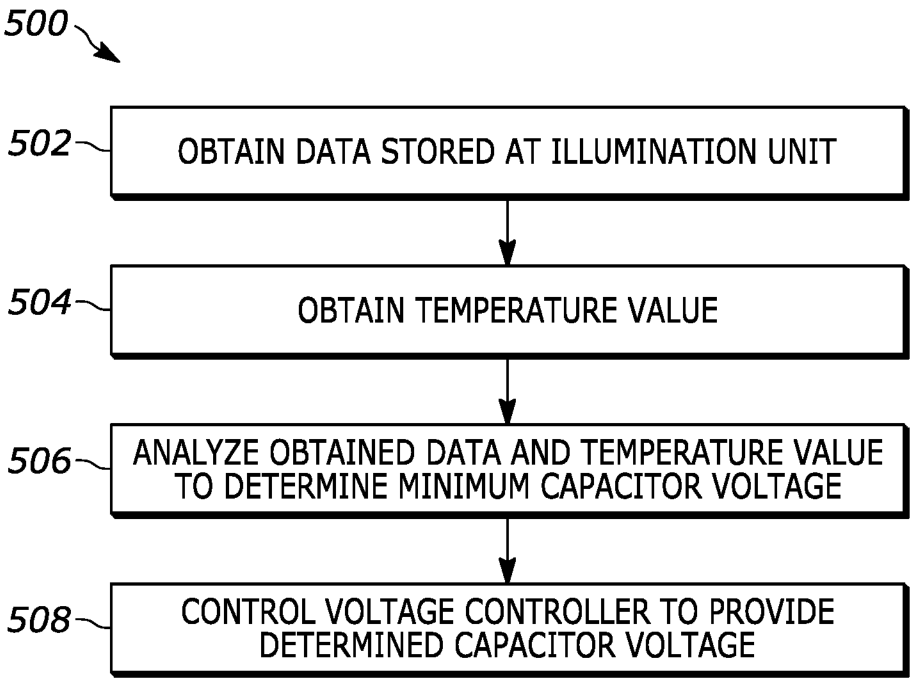

Turning now to FIG. 5, illustrated is an example flow diagram 500 for implementing the adaptive energy storage techniques described herein. The flow diagram 500 may be performed by a processor of an illumination system (such as the processor 120, 220, or 320 or FIGS. 1, 2A, and 3, respectively, and/or another similarly configured logic circuit).

At block 502, the processor obtains data stored at a memory (such as the memory 134 of FIG. 1) of an illumination unit (such as the illumination unit 130 of FIGS. 1 and 2A). For example, the data stored at the memory of the illumination unit includes one or more of a category voltage, a category current, a category temperature, a number of LEDs, an LED color, an LED binning, or an LED grouping arrangement.

At block 504, the obtains a temperature value from a temperature sensor (such as the temperature sensor 116 of FIG. 1). For example, the processor may be configured sample the temperature sensor to obtain the value during initial configuration of the illumination system, while calibrating the illumination system, and/or after executing an illumination cycle.

At block 506, the processor analyzes the obtained data and temperature value to determine minimum capacitor voltage to operate LEDs of the illumination unit (such as the LEDs 132 of FIGS. 1 and 2A) in accordance with an illumination cycle. This analysis may include performing the actions described with respect to block 416 to 448 of the flow diagram 400 of FIG. 4. For example, the processor may analyze the temperature value to determine a maximum allowable capacitor voltage. The processor may then configure a voltage controller (such as the voltage controller 112 of FIG. 1) to apply the maximum allowable capacitor voltage to a capacitor (such as the capacitors 120 and 220 of FIGS. 1 and 2A, respectively), execute a calibration pulse for the illumination cycle, and determine the minimum capacitor voltage based upon a voltage sensed at the LED driver output. The capacitor may be a bank of capacitors in at least one of parallel or series arrangement. In some embodiments, the voltage controller is a programmable buck/boost DC to DC power converter.

In these embodiment, in addition to configuring the voltage controller to apply the maximum allowable capacitor voltage, the processor may also control the voltage controller such that the voltage controller cannot exceed a current rating of a power supply providing an input voltage to the voltage controller. In some embodiments, the power supply is a USB power supply.

At block 508, the processor controls the voltage controller to convert an input voltage of the voltage controller to the determined minimum capacitor voltage, wherein the voltage controller is configured to apply the determined minimum capacitor voltage to the capacitor. The illumination system may include an LED driver (such as the LED drivers 122 and 222 of FIGS. 1 and 2A, respectively) configured to adaptively boost the capacitor voltage based upon operation of the one or more LEDs during the illumination cycle. While executing the illumination cycle using the determined minimum capacitor voltage, the processor may determine that a recalibration criterion is satisfied, execute a recalibration pulse for the illumination cycle, and determine an updated minimum capacitor voltage to operate the LEDs based upon a voltage sensed at the LED driver output. The processor may then reconfigure the voltage controller to supply the updated minimum capacitor voltage. As a result, the capacitor is recharged at a lower voltage level, thereby extending the life of the capacitor.

In some embodiments, prior to applying the determined minimum capacitor voltage, the processor determines that the minimum capacitor voltage exceeds a maximum operating voltage of the capacitor. Accordingly, the processor may control the illumination unit to operate at least one of a slower frame rate, a lower current, or a lower pulse duration. Additionally or alternatively, the processor may control the illumination unit to bypass at least one LED of the one or more LEDs.

Figure 6:
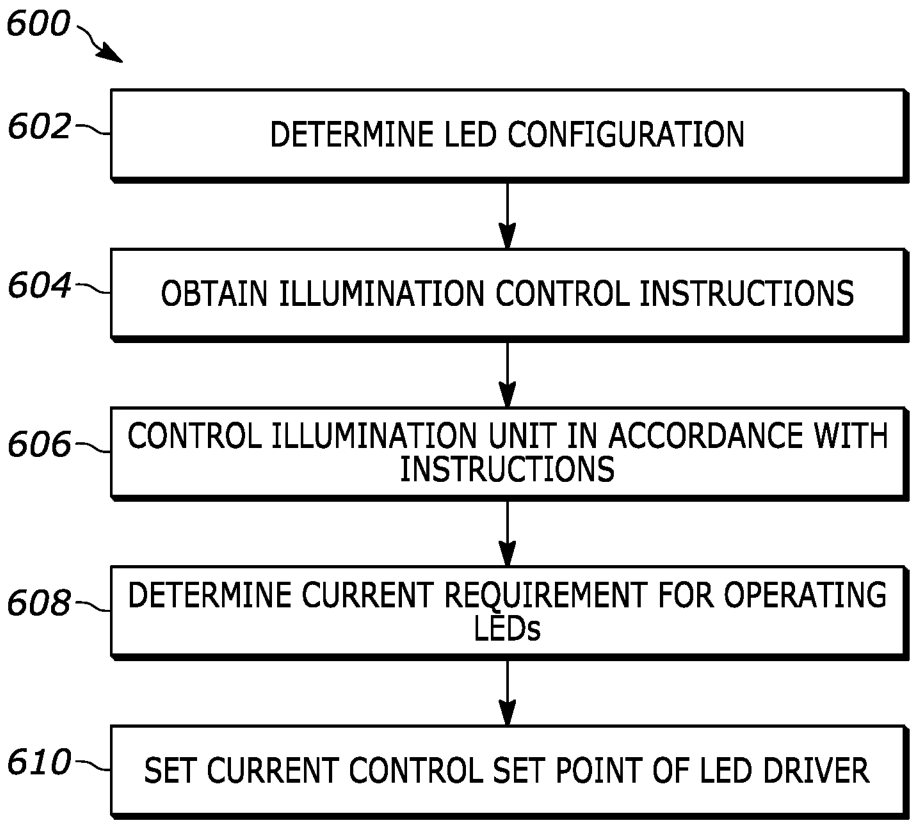
FIG. 6 illustrates an example flow diagram that implements the adaptive power drive techniques described herein.

FIG. 6 illustrates an example flow diagram 600 that implements the adaptive power drive techniques described herein. The flow diagram 600 may be performed by a processor of an illumination system (such as the processor 120, 220, or 320 or FIGS. 1, 2A, and 3, respectively, and/or another similarly configured logic circuit). While the adaptive power drive techniques described with respect to the flow diagram 600 may be implemented in illumination system that implements the adaptive energy storage techniques described with respect to the flow diagrams 400 and/or 500, the adaptive power drive techniques may be implemented with other power sources. For example, the flow diagram 600 may be implemented in an illumination system that stores power in a battery instead of a storage capacitor.

At block 602, the processor analyzes data in a memory (such as the memory 134 of FIG. 1) of an illumination unit (such as the illumination unit 130 of FIGS. 1 and 2A) to determine a configuration of one or more LEDs of the illumination unit (such as the LEDs 132 of FIGS. 1 and 2A). For example, the data may indicate a logical position (e.g., a bank number and a grouping number) at which current to the one or more LEDs can be controlled.

At block 604, the processor obtains illumination control instructions for operating the one or more LEDs during one or more illumination cycles. In some embodiments, the processor receives the illumination control instructions from an operator device (such as the operator devices 150 or 350 of FIGS. 1 and 3, respectively) operatively connected to an I/O port of the processor. To this end, the operator device may be configured to execute an illumination design application to enable an operator to design the illumination cycle. Additionally or alternatively, the processor may obtain the illumination control instructions based on data stored in the memory of the illumination unit. In some embodiments, the illumination unit may store a set of illumination control instructions that are obtained by the processor. In other embodiments, the processor may analyze the data indicative of the LED properties to generate a set of illumination control instructions. In one example, the processor generates a default set of illumination control instructions that illuminate all of the LEDs for predetermined pulse duration. In another example, the processor stores one or more sets application-specific illumination control instructions (e.g., barcode scanning, direct part marking (DPM) code scanning, etc.). In this example, the processor may adapt the application-specific illumination control instructions based on the data indicative of the LED properties.

In some embodiments, the processor provides the data obtained from the memory to the operator device. For example the processor may provide at least one of the configuration or a maximum current rating of the one or more LEDs to the illumination design application executing on the operator device.

At block 606, the processor controls one or more switches of the illumination unit in accordance with illumination control instructions. For example, if the illumination unit includes two or more banks of LEDs, the processor may control a switch that prevents current flowing into a bank of LEDs. As another example, if the LEDs are segmented into groups of LEDs, the processor may control a switch that bypasses current flow to the set of one or more LEDs. In some embodiments, the processors sends control signals over one or more general purpose input/output (GPIO) ports operatively connected to respective sets of the one or more switches (e.g., one set controls current flow into the illumination banks and another set control current flow into LED groupings). It should be appreciated that the switches need not be physical switches (e.g., relays). To this end, the switches may be transistors.

At block 608, the processor determines a current requirement for operating the one or more LEDs in accordance with the illumination control instructions. To this end, the processor may compare the illumination control instructions to the obtained LED data to determine an expected power requirement for operating the LEDs in accordance with the illumination instructions.

At block 610, the processor sets a current control set point of an LED driver (such as the LED drivers 122 and 222 of FIGS. 1 and 2A, respectively) to the current requirement. As the processor executes the illumination cycle, the voltage drop of the LEDs changes. By controlling the LED driver to a current set point, the voltage changes are automatically accounted for removing the need for a priori knowledge of the LED voltage drop. As a result, the power supplied to the illumination matches the actual power demands, reducing the amount of energy dissipated as heat and, in some embodiments, extending the life of a storage capacitor.

In some embodiments, prior to executing the illumination cycle, the processor obtains a maximum current rating for the illumination unit and compares the current control set point to the maximum current rating. If the processor determines that the current requirement exceeds the maximum current rating, the processor may instead set the current control set point to the maximum current rating and increase a pulse duration of the illumination cycle based on the difference between the current requirement and the maximum current rating. To this end, the processor may be configured to adjust the pulse duration such that the same amount of power is drawn at the lower maximum current rating level.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term “logic circuit” is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAS, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms “tangible machine-readable medium,” “non-transitory machine-readable medium” and “machine-readable storage device” is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms “tangible machine-readable medium,” “non-transitory machine-readable medium” and “machine-readable storage device” is expressly defined to exclude propagating signals. That is, as used in any claim of this patent, none of the terms “tangible machine-readable medium,” “non-transitory machine-readable medium,” and “machine-readable storage device” can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The claims are:

1. An illumination system of an imaging unit comprising:

an illumination unit that includes one or more light emitting diodes (LEDs) and a memory storing data indicative of the LEDs;

an LED driver;

a temperature sensor; and a voltage controller comprising:

a power input operatively connected to a power supply;

an input port configured to receive a control signal for setting an output voltage;

a voltage output port, wherein the voltage controller is configured to convert a voltage sensed at the power input port to an output voltage supplied to the voltage output port; and at least one processor operatively connected to the temperature sensor, the illumination unit, and the voltage controller, the at least one processor being configured to:

obtain the data stored at the memory of the illumination unit;

obtain a temperature value from the temperature sensor;

analyze the obtained data and the temperature value to determine a voltage to operate the LEDs in accordance with an illumination cycle; and send a control signal to the input port of the voltage controller to set the output voltage of the voltage controller to the voltage.

2. The illumination system of claim 1, wherein:

the voltage controller is a programmable buck/boost DC to DC power converter programmed by the at least one processor of the voltage controller to provide the voltage.

3. The illumination system of claim 2, wherein:

the buck/boost DC to DC power converter includes a programmable input current limiter and the at least one processor of the voltage controller is configured to program the programmable input current limiter such that the voltage controller cannot exceed a current rating of the power supply connected to the power input port.

4. The illumination system of claim 1, wherein the at least one processor is configured to:

analyze the temperature value to determine a maximum allowable voltage.

5. The illumination system of claim 4, wherein to determine the voltage to operate the LEDs, the processor is configured to:

configure the voltage controller to apply the maximum allowable voltage to the illumination unit via the voltage output port;

execute a calibration pulse for the illumination cycle; and determine the voltage to operate the LEDs based upon a voltage sensed at the LED driver output connected to the illumination unit.

6. The illumination system of claim 1, wherein the at least one processor is configured to:

determine that a recalibration criterion is satisfied;

execute a recalibration pulse for the illumination cycle; and determine an updated voltage to operate the LEDs based upon a voltage sensed at the LED driver output connected to the illumination unit.

7. The illumination system of claim 1, wherein the data stored at the memory of the illumination unit includes one or more of a category voltage, a category current, a category temperature, a number of LEDs, an LED color, an LED position, an LED binning, or an LED grouping arrangement.

8. The illumination system of claim 1, wherein the LED driver is configured to adaptively boost the voltage based upon operation of the one or more LEDs.

9. The illumination system of claim 1, wherein the power supply is a universal serial bus (USB) power supply.

10. A method for adaptive energy storage at an illumination system of an imaging unit, the illumination system adapted to receive an illumination unit that includes one or more light emitting diodes (LEDs) and a memory storing data indicative of the LEDs; an LED driver configured to supply power to the illumination unit; a temperature sensor configured to sense a temperature; and a voltage controller, the method comprising:

obtaining, by one or more processors, the data stored at the memory of the illumination unit;

obtaining, by the one or more processors, a temperature value from the temperature sensor;

analyzing, by the one or more processors, the obtained data and the temperature value to determine a voltage to operate the LEDs in accordance with an illumination cycle; and control, by the one or more processors, the voltage controller to convert an input voltage to the voltage controller to the voltage, wherein the voltage controller is configured to apply the voltage to the LED driver.

11. The method of claim 10, wherein:

the voltage controller is a programmable buck/boost DC to DC power converter.

12. The method of claim 10, the method further comprising:

controlling, by the one or more processors, the voltage controller such that the voltage controller cannot exceed a current rating of a power supply providing the input voltage to the voltage controller.

13. The method of claim 10, further comprising:

analyzing the temperature value to determine a maximum allowable voltage.

14. The method of claim 13, wherein determining the voltage comprises:

configuring, by the one or more processors, the voltage controller to apply the maximum allowable voltage to the illumination unit;

executing, by the one or more processors, a calibration pulse for the illumination cycle; and determining, by the one or more processors, the voltage based upon a voltage sensed at the LED driver output.

15. The method of claim 14, further comprising:

determining, by the one or more processors, that a recalibration criterion is satisfied;

executing, by the one or more processors, a recalibration pulse for the illumination cycle; and determining, by the one or more processors, an updated voltage to operate the LEDs based upon a voltage sensed at the LED driver output.

16. The method of claim 10, wherein the data stored at the memory of the illumination unit includes one or more of a category voltage, a category current, a category temperature, a number of LEDs, an LED color, an LED position, an LED binning, or an LED grouping arrangement.

17. The method of claim 10, wherein the LED driver is configured to adaptively boost the voltage based upon operation of the one or more LEDs.

18. The method of claim 10, wherein a universal serial bus (USB) power supply provides power to the voltage controller.

* * * * *